Jan. 14, 1969     S. YALLEN     3,421,998
ELECTROPHORESIS APPARATUS WITH MEMBRANE STRIP HOLDING MEANS
Filed Feb. 18, 1966     Sheet 1 of 3
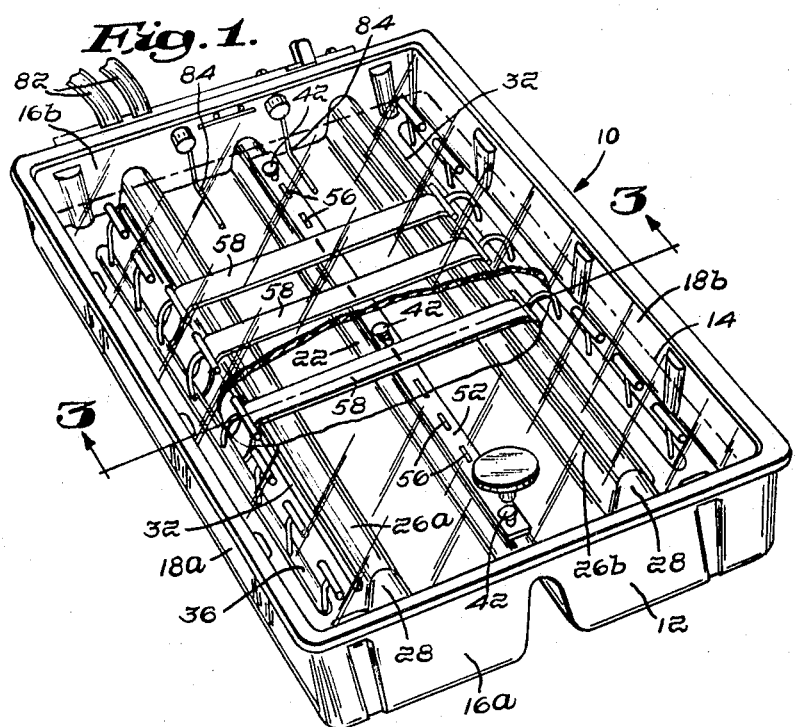
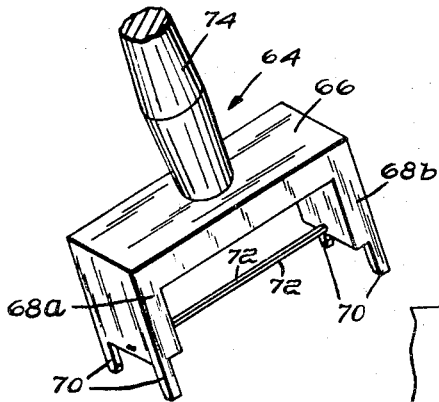
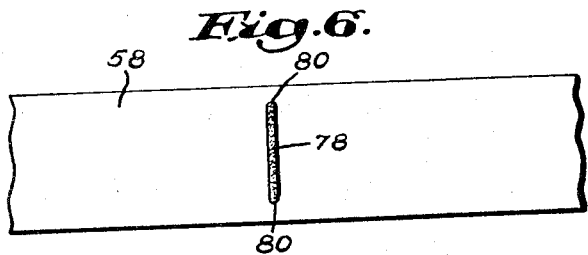
Inventor:
Stanley Yallen,
by Russell, Chittick & Pfund
Attorneys

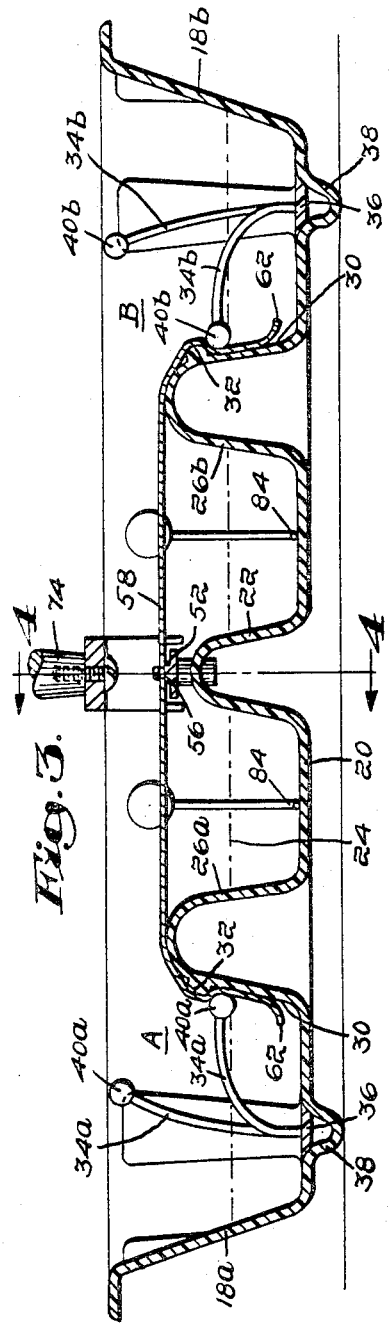
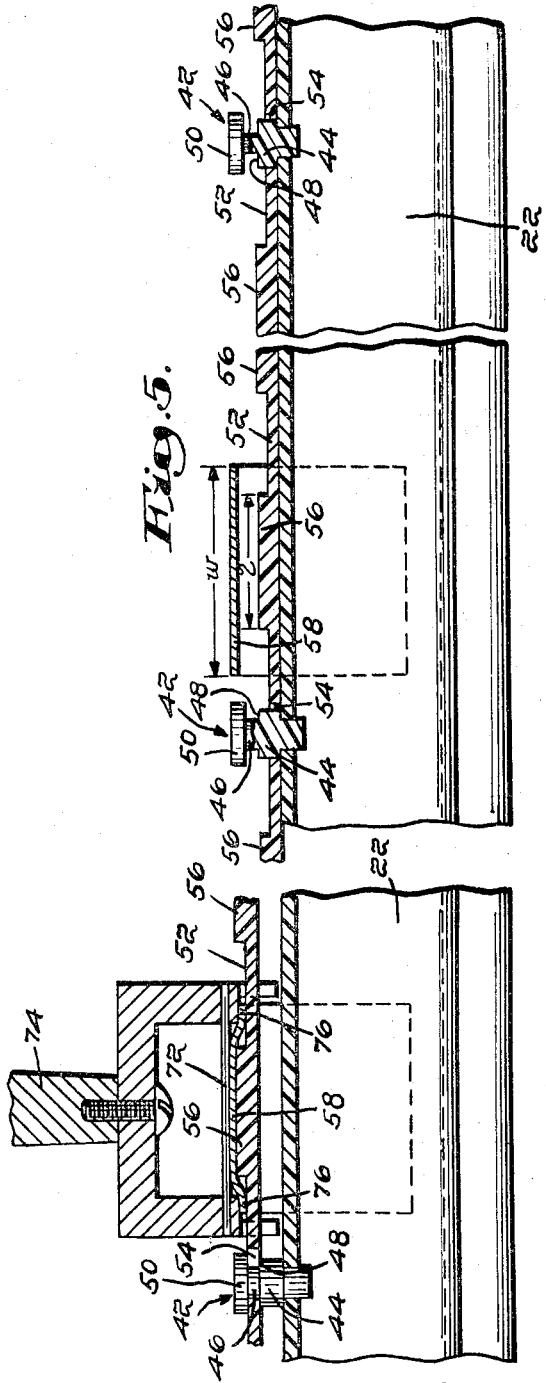

Inventor:
Stanley Yallen,
by Russell, Chittick & Pfund
Attorneys

United States Patent Office 3,421,998
Patented Jan. 14, 1969

3,421,998
ELECTROPHORESIS APPARATUS WITH
MEMBRANE STRIP HOLDING MEANS
Stanley Yallen, 116 Sunset Drive,
Brockton, Mass. 02401
Filed Feb. 18, 1966, Ser. No. 528,590
U.S. Cl. 204—299        10 Claims
Int. Cl. B01k 5/00

This invention relates generally to the electrophoresis method of identifying substances and more particularly to an improved apparatus for carrying out electrophoresis tests.

The electrophoresis method of testing is based on the theory that most substances contain suspended particles which when subjected to an electromotive force, will disperse in an identifiable pattern. Electrophoresis can be used to separate organic and inorganic compounds of human, animal, and inanimate origin. Separation of the components of various body fluids can be of considerable diagnostic use. Abnormal protein can be identified in either blood, urine, or in other body fluids. The various types of hemoglobin can be separated electrophoretically, as can isoenzymes. The use of electrophoresis in the various fields of research are almost limitless. Changes in body fluids and their components during development can be followed, both pre- and post-natal. Alterations produced by disease can easily be demonstrated, such as those caused by neoplasms. Animals can be classified by differences in their serum protein. These differences seem to follow specie differences, as has been shown with fish. For example, it has now been determined that various species of fish when in either the fresh, frozen, dried or partially cooked state, may be accurately identified by an electrophoresis test. In practice, a liquid drip which is commonly referred to as the "serum" is first collected from the fish sample to be tested. The serum is then deposited on a relatively thin membrane strip, such as for example, a cellulose acetate media. The strip is then subjected to an electromotovie force which creates a positive polarization at one end of the strip and a negative polarization at the other end. This in turn causes the proteins suspended in the serum to separate and begin moving, the rate of dispersion being dependent on the types of protein contained in the test sample. By continuing the application of the electromotive force for a given period of time, a spectrum of protein dispersion will be obtained which may then be compared to standard spectrums for various fish species to thus provide a means of identifying the particular fish being tested.

Although the electrophoresis method of testing appears to have excellent prospects in areas of medicine and industrial activity, such as for example, medical research laboratories, hospitals and the positive identification of foods, a number of problems have been encountered with conventional electrophoresis apparatus, which problems have to a considerable extent hindered more widespread acceptance of the method. These problems can be described by first briefly describing the equipment needed to practice the electrophoresis method of testing. The equipment consists basically of relatively thin membrane strips, an applicator for depositing a sample of the serum to be tested on the membrane strips, an electrophoresis chamber within which the strips are mounted during the test, and a power source adapted to be connected to the chamber and which when operated, will result in an electromotive force being applied to the membrane strips mounted within the chamber.

One problem with the electrophoresis chambers of known construction lies in the means employed for securing the membrane strips in place. For example, it is important that during the test, each strip be held taut with the portion of the strip on which the serum has been applied out of contact with any of the structural components of the chamber. At the present time, this is accomplished by use of strip fastening devices which have a number of parts separable from the basic chamber structure. These parts are difficult to manipulate and frequently become lost. Moreover, when mounting a strip, some of the fastener parts may inadvertently be dropped into the buffer solution contained within the chamber, thus contaminating the bufffer solution and destroying its effectiveness.

An important object of the present invention is to avoid the above-mentioned problems by providing an improved fastening means for securing the membrane strips within the electrophoresis chamber, which means is integral with the chamber structure, thus completely avoiding the possibility of various components becoming lost or inadvertently dropped into the buffer solution.

Another object of the present invention is to provide a strip fastening means for electrophoresis chambers which is operable not only to effectively secure the strips within the cabinet, but also to simultaneously insure that the strips are placed in the desired taut relationship.

Another object of the present invention is to provide a strip fastening means for electrophoresis chambers which is simple to operate, thus requiring no special skill and care on the part of the operator performing the test.

Other problems with known electrophoresis apparatus relate to difficulties encountered in properly applying a sample of the serum to be tested to the membrane strips. To explain, in order for the test to be successful, the application of serum to the strip should preferably take the form of a thin straight line extending transversely across the strip but stopping short of the strip edges. With conventional applicators, this condition can only be achieved through the exercise of considerable skill and care on the part of highly trained technicians. It is a further object of the present invention to provide an improved applicator which when used in conjunction with alignment means on the electrophoresis chamber structure, will insure proper application of the serum to the membrane strip.

A still further object of the present invention is to provide an improved means for applying the serum to the membrane strip, which means may be successfully operated by relatively unskilled personnel.

These and other objects of the present invention will become more apparent as the description procceds with the aid of the accompanying drawings in which:

FIG. 1 is a view in perspective of an electrophoresis chamber embodying the concepts of the present invention, with a portion of the transparent cover broken away;

FIG. 2 is a view in perspective of the serum applicator specially adapted for use with the electrophoresis chamber illustrated in FIG. 1;

FIG. 3 is a sectional view taken along line 3—3 of FIG. 1 with the chamber cover removed and showing the applicator being used to apply a test sample of serum to the membrane strip;

FIG. 4 is a sectional view taken along line 4—4 of FIG. 3;

FIG. 5 is a view similar to FIG. 4 with the supporting and aligning bar lowered to the inoperative position following the application of a test sample of serum to the membrane strip;

FIG. 6 is a plan view of a portion of the membrane strip showing the test sample of serum applied thereto;

Figure 7:
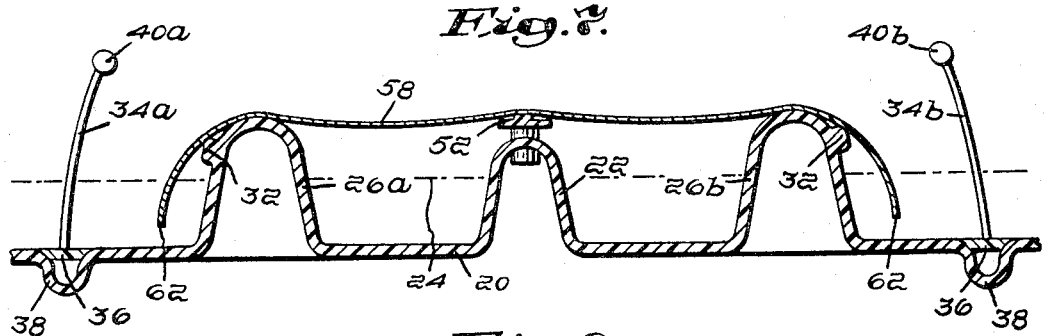
FIG. 7 is a diagrammatic view similar to FIG. 3 showing a thin membrane strip lying across the spaced support ridges and raised alignment bar of the electrophoresis chamber.

Referring initially to FIGURE 1, an electrophoresis chamber 10 embodying the concepts of the present invention is shown comprising a tray 12 covered by a transparent lid 14. As herein shown, the tray 12 is of a rectangular configuration having end walls 16a and 16b, side walls 18a and 18b and a bottom 20 (see FIG. 3). However, the rectangular configuration of the tray is not necessary to the present invention and it should be understood that trays with different shapes and configurations may also be used.

The interior of tray 12 is divided into two sections A and B by a dividing wall 22 which extends from end wall 16a to end wall 16b. For ease of construction, dividing wall 22 may be molded as an integral part of the tray bottom. In all cases, however, dividing wall 22, preferably should be of sufficient height to cooperate with the side and end walls of the tray in providing separate sections A and B having a depth sufficient to contain a conventional buffer solution indicated in the drawings by the references numeral 24. In practice, each of the sections A and B is normally filled with the buffer solution to a depth of approximately one-half inch.

As can further be seen in FIGS. 1 and 3, tray 12 is additionally provided with longitudinal support ridges 26a and 26b extending along the tray bottom 20 on either side of dividing wall 22. Again, ridges 26a and 26b may be molded as an integral part of the tray bottom. These ridges need not extend from end wall 16a to end wall 16b, but instead, may terminate short of one or both of the end walls as can be partially seen in FIG. 1 at 28. By allowing a space to remain between one or both ends of the support ridges 26a and 26b and the end walls of the tray, the depth of the buffer solution 24 will of course always be equal on both sides of the support ridges. As is best shown in FIG. 3, the support ridges 26a and 26b which are preferably of the same height, extend upwardly from the bottom 20 of the tray to a level above that of the top of dividing wall 22. Each support ridge is further provided on the side 30 remote from dividing wall 22 with a locking shoulder 32 extending along the length thereof.

Between support ridge 26a and tray side wall 18a, there is provided a series of aligned relatively thin resilient arms 34a extending upwardly from the tray bottom 20. As herein shown, the arms 34a are each connected at their lower ends to a strip 36 which is press-fitted into a depression 38 molded into the bottom of the tray. Each arm 34a is further provided at its upper end with a relatively short transversely extending gripping element 40a. An identical series of resilient arms 34b having gripping elements 40b at the upper ends thereof is provided between support ridge 26b and tray side wall 18b.

The dividing wall 22 is further provided along its upper edge with a plurality of relatively short vertically extending pins 42 which as can best be seen in FIGS. 4 and 5, are each provided with an enlarged diameter lower section 44, a smaller diameter intermediate section 46 extending upwardly from the lower section to form an annular shoulder 48 and a flat circular head 50. The pins 42 cooperate with the upper edge of supporting wall 22 in carrying an alignment bar 52. The alignment bar is provided with holes 54 large enough to axially accept the enlarged lower portions 44 of pins 42, thus permitting the bar to be placed in a lowered inoperative position resting directly on the upper edge of dividing wall 22 (as illustrated in FIG. 5). By raising the bar until it contacts the pin heads 50 and thereafter moving the bar axially towards either end wall 16a or 16b, the edges of the holes 54 in the bar will contact the outer cylindrical surface of the smaller diameter section 46 of the pins. At this point, the bar will be supported in an elevated operative position by the shoulders 48 on the pins. Alignment bar 52 is further provided along its upper surface with a plurality of axially aligned relatively thin spaced ribs 56, the significance of which will become more apparent in connection with portions of the description to be hereinafter provided.

When preparing the apparatus for a test, the operator will first fill both sections A and B of the tray with a known conventional buffer solution 24 to a depth approximately equal to that shown in FIG. 3. Relatively thin strips 58 of commercially available membrane material such as cellulose acetate tape are then dipped in the buffer solution 24 and thereafter laid transversely across the support ridges 26a and 26b and the elevated alignment bar 52. This condition is illustrated somewhat diagrammatically in FIG. 7 wherein it can be seen that in this position, each membrane strip 58 sags slightly between the support ridges 26a and 26b and the dividing wall 22 carrying alignment bar 52. The number of strips thus positioned will of course depend on the number of samples of serum to be tested. In the apparatus shown on the drawings, there is provision for securing eight such strips of membrane material, but it is to be understood that the apparatus could be modified to handle a greater or lesser number of strips.

Figure 8:
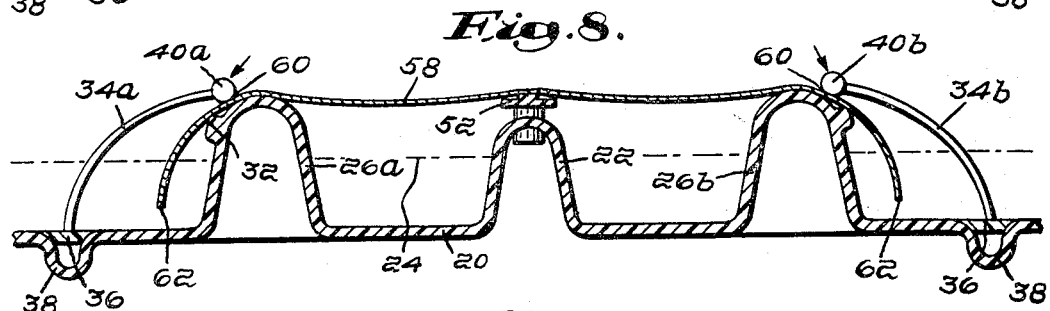
FIG. 8 is a view similar to FIG. 7 with the resilient arms bent downwardly to place the gripping elements in initial contact with the membrane strip.
Figure 9:
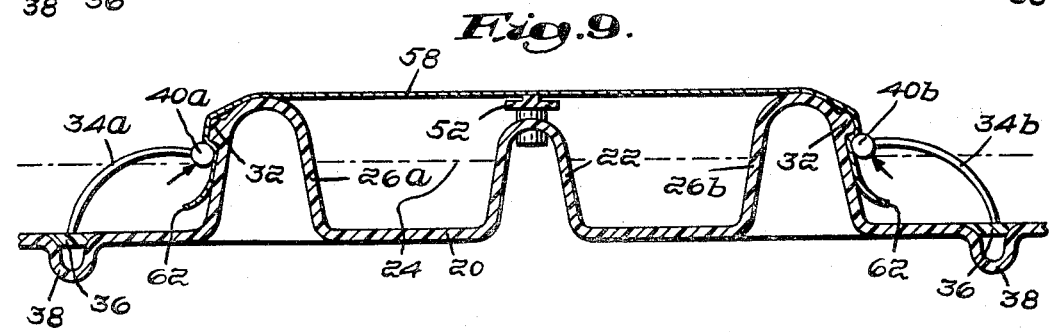
FIG. 9 is a view similar to FIGS. 7 and 8 showing the gripping elements carried by the resilient arms cooperating with locking shoulders on the support ridges to secure the membrane strip in the desired taut relationship.

Once the strips of membrane material 58 have been positioned as shown in FIG. 7, the operator then bends the opposed pairs of resilient arms 34a and 34b downwardly and inwardly to place the gripping elements 40a and 40b in contact with the upper surface of the strip at points 60 (see FIG. 8) above the locking shoulders 32 which are now in contact with the lower surface of the strip. Then, with one point on the strip 58 gripped between the outer surface of ridge 26a and the gripping element 40a on resilient arm 34a and with another point on the strip similarly gripped between gripping element 40b on resilient arm 34b and support ridge 26b, the operator presses downwardly on both gripping elements 40a and 40b to thus exert opposite forces on the strip tending to place the strip in tension. As the operator continues to press downwardly, (see FIG. 9), the membrane strip 58 is eventually pulled taut and the gripping elements 40a and 40b on resilient arms 34a and 34b finally wedged beneath the locking shoulders 32 on support ridges 26a and 26b. In this manner, the membrane strip is held taut between supporting ridges 26a and 26b with its ends 62 immersed in the buffer solution 24. It should also be noted that the undersurface of the membrane strip is contacted at a point intermediate supporting ridges 26a and 26b by the raised rib 56 on alignment bar 52, the latter having been previously adjusted to the raised position. As shown in FIG. 5, the length ($l$) of rib 56 is less than the total width ($w$) of the membrane strip.

With the membrane strip 58, (or strips where a plurality of samples are to be tested) properly secured in place, the operator is now ready to apply the sample of serum to be tested to the upper surface of the strip. To this end, an improved serum applicator generally indicated in FIG. 2 by the reference numeral 64 has been provided. Applicator 64 is comprised basically of a somewhat U-shaped structure having a base member 66 with opposed spaced extensions 68a and 68b depending therefrom. Each extension is further provided with two depending legs 70. A pair of closely spaced relatively thin wires 72 extend between depending extensions 68a and 68b. A handle 74 extends upwardly from base member 66 to provide the operator with a means for manipulating the applicator.

Figures 10, 11:
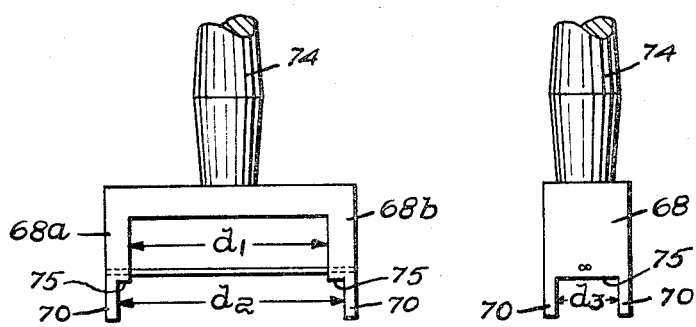
FIG. 10 is a side view of the serum applicator.
FIG. 11 is an end view of the applicator shown in FIG. 10.

Several dimensions on applicator 66 are of considerable importance. For example, as can be seen by comparing FIGS. 4, 5 and 10, the inside distance $d_1$ between the depending extensions 68a and 68b is less than the width ($w$) of the membrane strip 58 but greater than the length ($l$) of the individual ribs 56 on alignment bar 52. The distance $d_2$ between the opposed sets of legs 70 depending from the extension 68a and 68b is slightly greater than the width ($w$) of the membrane strips 58. As can be further seen by comparing FIGS. 3 and 11, the distance $d_3$ between adjacent legs 70 on both depending extension 68a and 68b is slightly greater than the width of alignment bar 52. The importance of these dimensions will now be explained in connection with a description of the procedure to be followed in applying a sample of serum to the taut membrane strip 58. The operator first places a small quantity of serum on the closely spaced wires 72 and through capillary action, the serum migrates along both wires to completely fill the space therebetween. The applicator is then placed over the portion of the strip 58 under which alignment bar 52 extends transversely. Thereafter, the applicator is lowered with the following action taking place: the applicator receives initial guidance in a lateral direction from the pending legs 70 which straddle the edges of membrane strip 58. At the same time, the applicator is transversely aligned relative to the strip by the cooperative action of adjacent legs 70 on each depending extension 68a and 68b straddling alignment bar 52. As the applicator is pressed downwardly, the lower faces 75 on depending extensions 68a and 68b come into contact with the upper surface of strip 58 at points 76 (see FIG. 4) adjacent the edges thereof, which points extend laterally in unsupported positions beyond the underlying rib 56 on the raised alignment bar 52. This results in the edges of the strip being pressed downwardly out of the operative range of the spaced wires 72 as the applicator is pressed downwardly onto the strip. As the wire 72 contacts the upper surface of the strip material 58, a thin line of serum is immediately transferred from the wires onto the strip material. The pattern of application of serum to the strip material is illustrated in FIG. 6 by the relatively thin deposit line 78. Due to the depressing action which the lower faces 75 of depending extensions 68a and 68b exert on the edges of the strip material, line 78 terminates as at 80 short of the edges of the strip material. By applying the line 78 of serum in this manner, objectionable "running" along the edges of the strip 58 is avoided. This is accomplished without any special care on the part of the operator, due to the specially dimensioned alignment features embodied in the applicator 66, which features cooperate with alignment bar 52.

Following application of serum to each of the membrane strips 58, alignment bar 52 is lowered to the inoperative position shown in FIG. 4.

The above procedure may be repeated to apply test samples of serum to other strips similarly held in the electrophoresis chamber. When all of the strips have had serum samples deposited thereon, the alignment bar 52 is then lowered to the inoperative position shown in FIG. 5 and the chamber cover 14 put in place. Thereafter, a power source (not shown) connected to the chamber via wire leads 82 and electrodes 84 is put into operation for a predetermined period of time to carry out the electrophoresis test.

It is my intention to cover all changes and modifications of the embodiment herein chosen for purposes of disclosure which do not depart from the spirit and scope of the invention.

I claim:

1. An electrophoresis chamber comprising the combination of: a tray separated into two sections by a dividing wall extending upwardly from the bottom thereof, each said sections being suitably dimensioned to contain a desired measure of buffer solution; stationary support means in each said sections spaced laterally from said dividing wall, said support means extending upwardly to a level above that of the top of said dividing wall; and, a plurality of resilient holding means disposed laterally from each of said support means on the sides of said support means remote from the dividing wall, said holding means extending upwardly from the bottom of said tray and being adapted to be deflected to an operative position cooperating with said support means in securing at least one membrane strip in a taut position extending transversely over said dividing wall, the strip when in said taut position being spaced vertically above said dividing wall with its end immersed in the buffer solution contained in each said sections.

2. The apparatus as set forth in claim 1 further characterized by said stationary support means and said holding means being integral with the bottom of said tray.

3. The apparatus as set forth in claim 1 wherein said stationary support means is comprised of a ridge in each of said sections extending upwardly from the bottom of said tray, said ridges located in parallel spaced relationship on either side of said dividing wall.

4. The apparatus as set forth in claim 3 further characterized by each said ridges having a locking shoulder extending along the length thereof, said locking shoulders being located below the tops of said ridges on the side facing said holding means.

5. The apparatus as set forth in claim 4 wherein said holding means is comprised of a plurality of vertically disposed resilient arms, each of said arms being attached at the lower end to the bottom of said tray, the upper end of each said arms in turn being provided with a transverse gripping bar adapted to cooperate with the locking shoulder on the adjacent ridge to frictionally engage membrane strips therebetween.

6. The apparatus as set forth in claim 3 further characterized by guide means carried by said dividing wall for selective movement between a lowered inoperative position below the level of said ridges to an elevated operative position at the level of said ridges and in contact with the undersurface of membrane strips held in an overlying taut position by the cooperative action of said stationary support means and said holding means, said guide means being adjustably held in place by pins which extend vertically from said dividing wall through holes in said guide means, each of said pins having a shoulder on which said guide means is supported when in the elevated operative position.

7. The apparatus as set forth in claim 6 wherein said guide means is comprised of an elongated bar having a plurality of relatively thin raised ribs spaced along the upper surface thereof, said ribs being arranged to contact the undersurface of overlying taut membrane strips.

8. Electrophoresis apparatus comprising in combination: a tray separated into two sections by a dividing wall extending upwardly from the bottom thereof, each said sections being suitably dimensioned to contain a desired measure of buffer solution; stationary support means in each said sections; resilient holding means disposed laterally from each of said support means on the side thereof remote from said dividing wall, said stationary support means and said holding means being integral with the bottom of said tray, said holding means being adapted to be deflected from a vertically disposed position relative to the bottom of said tray to an operative position cooperating with said stationary support means to secure one or more membrane strips in a taut position extending transversely over said dividing wall with the ends of said strips immersed in the buffer solution contained in each said sections; an elongated guide bar having relatively thin raised ribs spaced along the upper surface thereof, said guide bar being mounted on said dividing wall for selective movement between a lowered inoperative position beneath the level of said stationary support means and a raised position with said ribs level with said stationary support means and in contact with the undersurfaces of any overlying membrane strips; an applicator separably positioned on said guide bar and suitably dimensioned to cooperate with said guide bar and the raised ribs thereon in contact with the undersurfaces of said strips in applying a liquid sample of serum to the upper surfaces of said strips; a cover for said tray; and means for applying a voltage across the buffer solution in said sections, thus subjecting the serum on said strips to an electromotive force.

9. The apparatus as set forth in claim 8 wherein said applicator is provided with at least two guide surfaces cooperating with the edges of said guide bar to insure that serum is applied to the upper surface of each membrane strip along a line extending parallel to the ribs on said guide bar.

10. The apparatus as set forth in claim 9 wherein the said applicator is further provided with shoulders spaced to cooperate with the ribs on said guide bar in downwardly deflecting the sides of said strips so as to insure that the line of application of said serum to the upper surface of said strips extends between points spaced inwardly from the edges of said strips.

References Cited

UNITED STATES PATENTS

| | | | |
|---|---|---|---|
| 2,768,948 | 10/1956 | McDonald et al. | 204—180 |
| 2,834,729 | 5/1958 | Pickels et al. | 204—180 |
| 3,317,418 | 5/1967 | Zec | 204—299 |

FOREIGN PATENTS 525,981  3/1955  Italy.

JOHN H. MACK, *Primary Examiner.*

E. ZAGARELLA, *Assistant Examiner.*

U.S. Cl. X.R.

204—180